United States Patent
Burns

[19]

[11] Patent Number: 6,141,374
[45] Date of Patent: Oct. 31, 2000

[54] METHOD AND APPARATUS FOR GENERATING MULTIPLE MATCHED-FILTER PN VECTORS IN A CDMA DEMODULATOR

[75] Inventor: Geoffrey F. Burns, Macungie, Pa.

[73] Assignee: Lucent Technologies Inc., Murray Hill, N.J.

[21] Appl. No.: 09/172,457

[22] Filed: Oct. 14, 1998

[51] Int. Cl.[7] .................................................. H04L 27/30
[52] U.S. Cl. ............................ 375/152; 375/150; 331/78; 708/250
[58] Field of Search ....................... 375/130, 140, 375/143, 145, 147, 149, 150–152; 370/335, 342; 708/250; 331/78

[56] References Cited

U.S. PATENT DOCUMENTS

| | | | |
|---|---|---|---|
| 3,728,529 | 4/1973 | Kartchner et al. | 708/250 |
| 3,947,634 | 3/1976 | Betts | 375/367 |
| 4,707,839 | 11/1987 | Andren et al. | 375/150 |
| 5,237,586 | 8/1993 | Bottomley | 370/206 |
| 5,239,587 | 8/1993 | Schoolcraft | 375/150 |
| 5,243,622 | 9/1993 | Lux et al. | 375/147 |
| 5,305,349 | 4/1994 | Dent | 370/342 |
| 5,327,455 | 7/1994 | De Gaudenzi et al. | 370/207 |
| 5,361,276 | 11/1994 | Subramanian | 375/150 |
| 5,442,627 | 8/1995 | Viterbi et al. | 370/209 |
| 5,442,661 | 8/1995 | Falconer | 370/479 |
| 5,448,600 | 9/1995 | Lucas | 370/342 |
| 5,519,736 | 5/1996 | Ishida | 375/367 |
| 5,640,416 | 6/1997 | Chalmers | 375/147 |
| 5,740,088 | 4/1998 | Nakagawa et al. | 708/253 |
| 5,745,529 | 4/1998 | Hikoso et al. | 375/150 |
| 5,926,070 | 7/1999 | Barron et al. | 331/78 |

*Primary Examiner*—Stephen Chin
*Assistant Examiner*—Lenny Jiang
*Attorney, Agent, or Firm*—Ian M. Hughes; Steve Mendelsohn

[57] ABSTRACT

A vector generator generates one or more pseudo-random noise PN sequences as matched-filter PN vectors for a matched-filter correlator of a code division, multiple-access (CDMA) demodulator. The period and clock of the local PN code sequence may be employed as a time reference, and each matched-filter PN vector has a known code-phase offset with respect to the local PN code sequence. Matched-filter PN vectors having a chip-length on the order of a data symbol period, such as 64-chip sequences, are generated within a short period of time compared to the period of the local PN code sequence. A state of the local PN code sequence is periodically captured from the local PN code sequence, which state is employed by a PN generator generating a similar PN code sequence but clocked at a higher rate. Consequently, a series of offset PN code sequences are generated in advance of the local PN code sequence. Combined with single or parallel offset masking, any desired matched-filter PN vector may be generated from the offset PN code sequences within a short period when compared to the period of the local PN code sequence. The generation time of each matched-filter PN vector may be 1-chip period in duration. A vector correlator of a RAKE receiver may employ the vector generator in a CDMA communication system. Consequently, the vector generator provides the vector correlator with matched-filter PN vectors for a matched-filter, multiple-finger search. The vector generator allows for time-multiplexed generation of the matched-filter PN vectors.

28 Claims, 3 Drawing Sheets

METHOD AND APPARATUS FOR GENERATING MULTIPLE MATCHED-FILTER PN VECTORS IN A CDMA DEMODULATOR

BACKGROUND OF THE INVENTION

1. Field of the Invention

The present invention relates to generation of multiple, PN matched-filter vectors for high-rate, multiplexed correlation in a CDMA demodulator.

2. Description of the Related Art

Several code division, multiple-access (CDMA) standards have been proposed, and one such standard is the IS-95 standard adopted for cellular telephony. As with many CDMA systems, IS-95 employs both a pilot channel for a base station and data or message channels for communication by the base station and users. The base station and users communicating with the base station each employ assigned, pseudo-random sequences, also known as pseudo-noise (PN) code sequences, for spread-spectrum "spreading" of the channels. The assigned PN code sequence is a sequence of a predetermined number of bits. For each user transceiver, the PN code sequence is used to spread data transmitted by the transceiver and to despread data received by the transceiver. The PN code sequence is used for both In-phase (I) and Quadrature-phase (Q) channels, is a sequence with a known number of bits, and is transmitted at a predetermined clock rate.

Each bit-period, or phase transition, of the PN code sequence is defined as a chip, which is a fraction of the bit-period of each data symbol. Consequently, the PN code sequence is combined with the data sequence so as to "spread" in frequency the frequency spectrum of the data. In IS-95, for example, 64 chips represent one data symbol. The pilot channel and each user are also assigned a different Walsh code that is combined with the spread channel to make each spread channel signal orthogonal. The pilot channel is assigned the all zeros Walsh code. An exclusive-OR combination of the zero Walsh code with the PN code sequence of the I and Q channels, respectively, leaves the PN code sequence of the pilot channel unaltered. No data symbols are spread or transmitted on the pilot channel.

To determine when a signal is transmitted, and to synchronize the reception and processing of a transmitted signal, IS-95 specifies a search finger correlating a known portion of the PN code sequence, for example, an IS-95 pilot epoch, with the sampled received signal. The pilot epoch is the time interval over which a pseudo-noise (PN) code sequence of a pilot signal repeats. The known portion of the IS-95 pilot epoch is the first 64 chips output from I-phase and Q-phase PN sequence generators subsequent to a rollover state. The beginning of the pilot epoch is the rollover state, and is the state at which the I-phase sample sequence and Q-phase sample sequence PN generators have the same logic value in all register stages of the PN code generator. The IS-95 system may insert an extra value in the PN code sequence so that the PN code sequence is a multiple of 2. Additional logic may be required to insert the extra value into each sequence following 14 consecutive 1's or 0's. The extra value renders a $2^{15}$ chip period PN sequence. Consequently, or systems such as IS-95, at the beginning of the pilot epoch the value in the first register stage is forced o a logic "1" prior to the next state transition from the all zero register state.

Demodulation of a spread signal received from a communication channel requires synchronization of a locally generated version of the PN code sequence with the embedded PN code sequence in the spread signal. Then, the synchronized, locally generated PN code sequence is correlated against the received signal and the cross-correlation extracted between the two. The signal of the extracted cross-correlation is the despread data signal. For IS-95 systems, demodulation begins by first synchronizing a local code sequence pair, one for the I-phase spread data channel (I-channel) and one for the Q-phase spread data channel (Q-channel), with an identical pair of PN code sequences embedded in the signal received from the communication channel.

Communication systems are often subject to transmission path distortion in which portions, or paths, of a transmitted signal arrive at a receiver, each signal having a different time offset and/or carrier phase rotation. Consequently, the transmitted signal appears as a multiplicity of received signals, each having variations in parameters relative to the transmitted signal, such as different delays, gains and phases. Relative motion between a transmitter and receiver further contribute to variations in the received signal. The receiver desirably reconstructs the transmitted signal from the multiplicity of received signals.

A type of receiver particularly well suited for reception of multipath, spread spectrum signals is a RAKE receiver. The RAKE receiver comprises several search fingers to cross correlate each multipath signal with an offset version of the local PN code sequence. The RAKE receiver optimally combines the multipath signals received from the various paths to provide an extracted cross-correlated signal with high signal-to-noise ratio (SNR). The RAKE receiver may be analogized to a matched-filter where the path gains of each search finger, like the taps of a matched-filter, may be estimated to accurately detect a received multipath, spread spectrum signal. Since a transmitted signal is subject to many types of distortion as it passes through a communication channel to a receiver (i.e., multipath effects, Rayleigh fading, and Doppler shifts), the receiver must estimate the path gains utilizing the transmitted signal as distorted at the receiver. Thus, the detected received signal will only be as good as the path gain estimation of each search finger in the RAKE receiver.

U.S. Pat. Nos. 5,448,600; 5,442,661; 5,442,627; 5,361,276; 5,327,455; 5,305,349; and 5,237,586, the disclosures of which are hereby incorporated by reference, each describe a RAKE receiver. In RAKE receivers, for each fractional chip increment, a correlation with the pilot epoch is performed, which may be represented using the complex conjugate of the expected sequence, $x_r(n)+x_i(n)$, as $$cc_r(n) = \sum_{m=0}^{63} x_r(m) \cdot y_r(m+n\tau) + \sum_{m=0}^{63} x_i(m) \cdot y_i(m+n\tau) \quad (1)$$

and $$cc_i(n) = \sum_{m=0}^{63} x_r(m) \cdot y_i(m+n\tau) + \sum_{m=0}^{63} x_i(m) \cdot y_r(m+n\tau) \quad (2)$$

where: n and m are integer counters $cc_r(n)$ are the real components of the cross-correlation $cc_i(n)$ are the imaginary components of the cross-correlation y is the sampled received signals x is the reference sequence (matched-filter PN sequence)

τ is a fractional chip

Thus, as can be seen from equations (1) and (2), four real correlations are performed in the process of performing one complex correlation.

The locally generated PN code sequence (the "local PN code sequence" or "reference PN code sequence") provides the basic elements for generating reference PN sequences, or matched-filter PN vectors, for matched-filter correlation against the received signal. Each PN code sequence is deterministic with a period of $2^{N-1}$ chips (PN values), N an integer greater than 1. The PN code sequence is identical between base-stations in an IS-95 system, and may be augmented by one chip to provide a sequence with a period of $2^{15}$ chips. This PN code sequence is also known as the "short" code in IS-95 systems. The PN code sequence of each base-station, is used for forward channel spreading in IS-95-based CDMA communication systems with a code-phase offset of the PN code sequence unique to a base-station. Therefore, to differentiate between base-stations, each base-station is assigned a unique time offset in the PN code sequence.

A PN code generator provides the code for each of the I and Q channels recursively using a $15^{th}$ order polynomial, resulting in a period of, for example, $2^{15}-1$ chips. The hardware realization for such a PN code generator is a shift register having 15 stages and with selected shift register outputs combined in modulo-2 addition to form the next PN code sequence value that is also the recursive input value to the beginning of the shift register.

Figure 1:
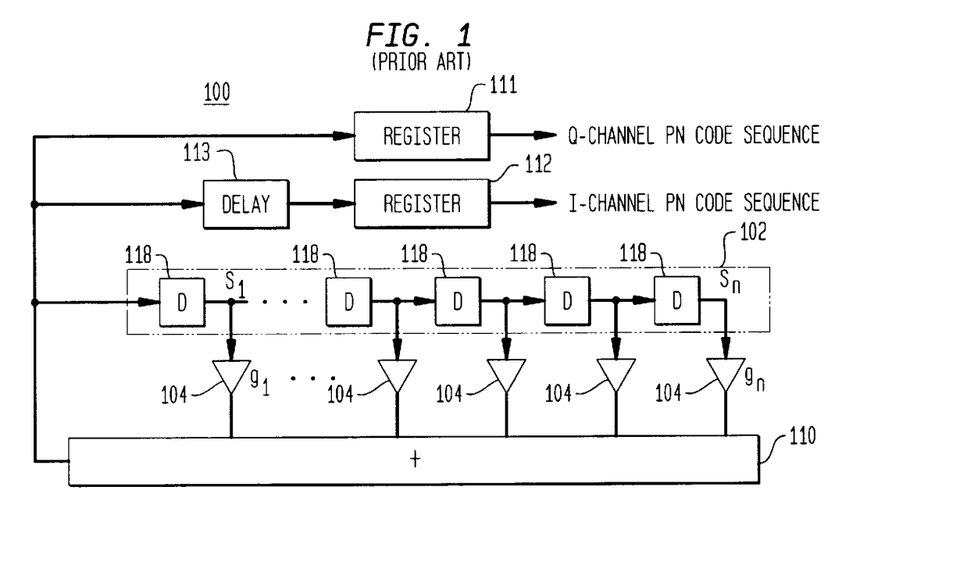
FIG. 1 shows a generalized pseudo-noise (PN) generator of the prior art as may be used to generate a PN code sequence.

Referring to FIG. 1, there is shown a generalized pseudo-noise (PN) generator as may be used to generate a PN code sequence. The hardware implementation of the generator shown in FIG. 1 is of a Fibonacci type, but other types of generators, such as a Galois type, may be used. The generalized PN generator 100 as shown in FIG. 1 includes shift register 102, gain amplifiers 104, and modulo-2 adder 110. PN generator 100 may further include registers 111 and 112 and optional delay 113. In FIG. 1, gain amplifiers 104 have gain values $g_{[n:0]}$, that are the generating polynomial coefficients of the generating polynomial G. Also, $S=S_{[n:0]}$ is the state of shift register 102.

As is known in the art, PN generator 100 generates a code in the following manner. First, shift register 102 is loaded with a polynomial "seed" value. The seed value is typically one state of the shift register that forms a portion of the resulting PN sequence. Then, for each clock cycle, the value of the shift register is combined via gain amplifiers 104 in a modulo-2 adder 110. Each gain amplifier 104 adjusts the value in each corresponding stage of the shift register 102 according to generating polynomial coefficients. This is a cyclic process: the value in modulo-2 adder 110 is then applied to the first element of the shift register 102 and the last element is discarded. Each state of the shift register 102 may be loaded into storage registers 111 and 112 for use with, for example, the I and Q channels, respectively. Delay 113 may be employed to provide a known code-phase offset between PN sequences provided from storage registers 111 and 112.

The IS-95 system may augment the PN code sequence by inserting an extra value in the PN code sequence so that the PN code sequence is a multiple of 2. Additional logic (not shown in FIG. 1) inserts the extra value into each sequence following 14 consecutive 1's or 0's. The extra value renders a $2^{15}$ chip period PN sequence. Also, as is known in the art, a periodic bit sequence with a first code phase may be combined with another sequence to form the same periodic bit sequence with a second code phase. This process is known as masking. Consequently, a delayed, or offset, version of the sequence may be generated by modulo-2 addition of appropriate state bits of the shift register 102 with a selected mask. Additional logic for correcting the masked sequences may also be required if the PN code sequence is augmented.

For a receiver in a spread-spectrum system using a matched-filter correlator, as would be apparent to one skilled in the art, many matched-filter PN vectors must be generated in a receiver. For example, in a receiver's acquisition mode the receiver determines whether the pilot signal is present. In acquisition mode, the search finger must search through all fractional chip offsets of the pilot epoch in order to locate the pilot signal. As described previously, each complex correlation actually requires four real correlations. Correlations of search fingers in a RAKE receiver are often performed against multiple, fractional-chip offsets simultaneously, such as during initial search or handoff between base-stations. If a receiver tracks several base stations, as may be required for handoff, then the acquisition mode process must occur for the pilot of each base station.

Further, even when synchronization is achieved when the pilot signal is present, a receiver's data detection mode detects a signature sequence intended for the particular receiver. The signature sequence, in IS-95, may be a "long" PN code sequence for security (i.e., the sequence of the "long" PN code is longer than the sequence of the "short" PN code). In the data detection mode, there are several sub-modes. The sub modes include a paging data mode, a synchronization data mode, and a traffic mode.

For IS-95 systems, during the paging data and traffic modes, the search finger must scan for other signals over a limited search range relative to the time of arrival of the first 64 or 128 chips following the all-zero state of the base station pilot epoch. If the search function is to be accomplished in real time, using a 64 chip matched-filter, the number of accumulators may be calculated as: (64 chips) times (8 offsets per chip) times (four real correlations per complex correlation). Consequently, 2048 accumulators may be required. Since it is not practical to provide 2048 accumulators, prior art correlators have accepted a trade-off between the amount of hardware provided and the time required to complete the search function by implementing multiple time offset correlations such as by operating multiple serial accumulators in parallel.

Simultaneous correlation operations may be achieved using multiple parallel correlators and vector generators. Prior art methods for generating multiple, matched-filter PN vectors include the following. First, a set of multiple, parallel PN code sequence generators, each generating the PN code sequence with a different offset may be employed. Unfortunately, since a receiver performs so many different search operations, this implementation requires an impractical amount of hardware. Second, a single PN code sequence generator may be employed with a set of parallel masks, each mask combined with the local PN code sequence to generate a PN sequence having a different offset. The parallel sequences may be collected in a shift register and applied to the correlator when required. The advantage of this approach is the relatively low clocking rate required (1.2288 MHz). However, in high speed data or base station handoff situations where a large degree of correlation scheduling flexibility is required and several matched-filter PN vectors may be needed in a single symbol, a large quantity of 64-bit shift registers would be required.

SUMMARY OF THE INVENTION

The present invention relates to a vector generator that generates at least one matched-filter vector from a reference PN sequence, the reference PN sequence having an initial state and a first clock rate. In one embodiment, an initial state of the reference PN sequence is captured and at least one fast-forward PN sequence is generated from the captured initial state. The fast-forward PN sequence is a sequence of chip values equivalent to chip values of the reference PN sequence and is generated at a second clock rate greater than the first clock rate. Each matched-filter vector corresponds to one fast-forward PN sequence having a corresponding code-phase offset when compared to the code phase of the reference PN sequence.

In a further embodiment of the present invention, the vector generator further includes a mask offset circuit, the mask offset circuit receiving the fast-forward PN sequence and applying a mask value to the fast forward PN sequence to generate the matched filter vector. The mask value combined with the fast-forward PN sequence provides a sequence of chip values equivalent to chip values of the reference PN sequence and having a code-phase offset from the code phase of the reference PN sequence determined by the mask value.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 2:
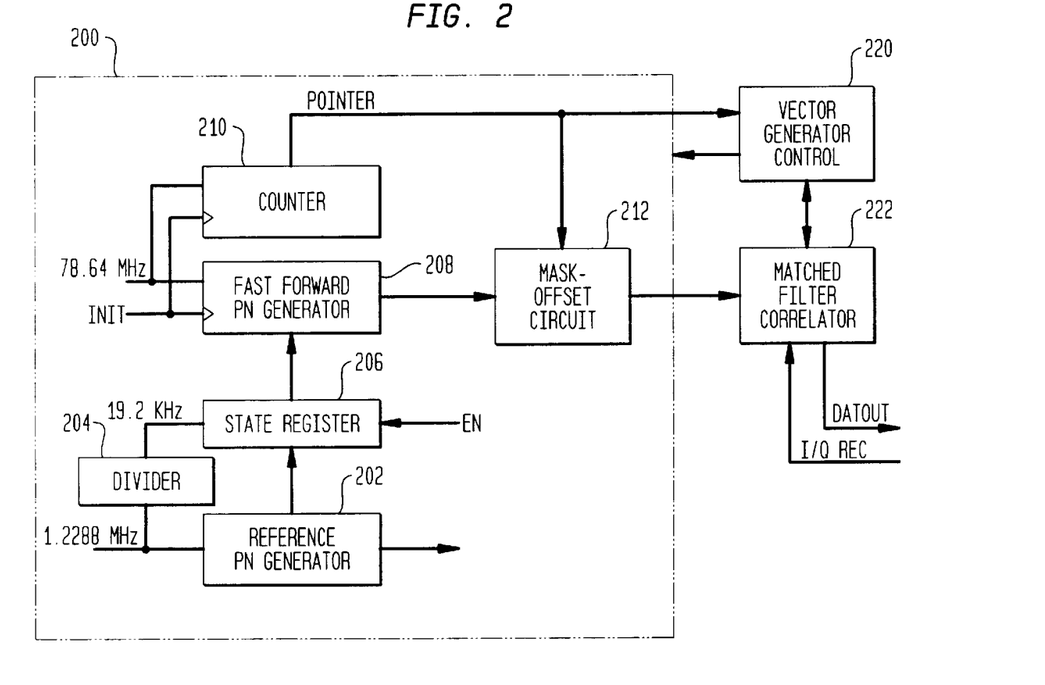
FIG. 2 shows a vector generator in accordance with an embodiment of the present invention.

Referring to FIG. 2, there is shown a vector generator 200 in accordance with an embodiment of the present invention. The vector generator 200 may employ both a set of masks and fast forwarding offset states of a local PN sequence. As shown in FIG. 2, the vector generator 200 includes a reference PN generator 202, a clock divider 204, a state register 206, a fast forward (FF) PN generator 208, an optional counter 210 and mask-offset circuit 212.

Also shown in FIG. 2 is a vector generator control 220 and matched-filter correlator 222 of a vector correlator that may employ the vector generator of the present invention. Matched-filter correlator 222 implements the search finger as a detection of cross-correlation of the PN code vector combined with the sampled signals of the I-channel and Q-channel, I/Q REC. Vector generator control 220 provides signals to the vector generator 200 specifying the particular PN code vectors to be provided to the matched-filter corr-elator 222. Desirably, the vector correlator may be optimized so as to employ pipeline processing of the search fingers by matched-filter correlator 222. Such processing may allow the advantage of synchronizing to, and tracking of, pilot signals of several IS-95 base-stations.

Reference PN generator 202 and FF PN generator 208 each generate PN code sequences as is known in the art such as described with reference to FIG. 1. Although the following describes vector generation with respect to a single local PN code sequence from reference PN generator 202, the present invention is not so limited. The PN code sequences for the I-channel and Q-channel may be the same PN code sequence with either the same or different code-phase offsets with respect to a reference. For systems such as IS-95, however, the PN code sequences for the I-channel and Q-channel may be different PN code sequences. For example, the reference and fast forward PN generators 202 and 208, respectively, may be duplicated to generate pairs of offset PN code sequences as matched-filter PN vector pairs for correlation with received values (I/Q rec) of the I-channel and Q-channel.

State register 206 stores a reference state λREF of the local PN code sequence generated by the reference PN generator 202. This local PN code sequence is a free running code that may have a zero code-phase offset with respect to a reference code-phase. The PN local code sequence is clocked at, for example, 1.2288 mega-chips per second (Mcps). The reference state λREF of state register 206 is a particular state value within the local PN sequence that is contained in the shift register of reference PN generator 202. The particular reference state captured may be specified by the vector generator control 222 and captured by the state register 206 via a clock transition and/or enabling signal EN. The EN signal may be a separate signal generated by the vector generator control 220, or may be a clock signal derived from the clock of either the reference PN generator 202 or the data symbol clock. As shown in FIG. 2, the clock of the reference PN generator 202 may be divided by divider 204 to provide a divided clock signal for the state register 206. Also, a separate EN signal is shown that may enable or disable the capture of successive states on each divided clock transition.

FF PN generator 208 is loaded with the reference state λREF of state register 206 and generates fast-forward PN sequence, which is an offset PN code sequence identical to the local PN code sequence, or a portion thereof, generated by reference PN generator 202 from the same reference state. FF PN generator 208 loads the reference state in accordance with an INIT signal provided by the vector generator control 220. The offset PN code sequence may be the entire local PN code sequence, but is typically a portion of the local PN code sequence. The length of the offset PN sequence is determined by the period between successive INIT signals and the clock rate of the FF PN generator 208. The INIT signal may be used to repetitively generate the same sequence from one reference state if the EN signal does not update the value of the state register 206 with a successive reference state. The generation time of each matched-filter PN vector of this case may be 1-chip period in duration. Optional counter 210 may also be clocked at the clock rate of the FF PN generator 208 provide a counter value related to the offset of the sequence generated by the FF PN generator 208. Further, the INIT signal and EN signal may be employed together to generate a periodic sequence of offset PN code sequences by periodically selecting reference states with the EN signal, and generating particular sequences from each reference state with the INIT signal.

Typically, the state register 206 may be updated with either 1) the same reference state or another specified state of the sequence determined by vector generator control 220, or 2) successive reference states for each clock period of the data symbol clock. For example, as described previously, the clock of the reference PN generator 202 at 1.2288 MHz may be divided by the number of chips in a data symbol, for example 64, to provide a divided clock signal of 19.2 KHz for the state register 206. This may be employed such that correlations by the matched-filter correlator 222 occur over a data symbol period. Also, the FF PN generator 208 may provide the offset PN sequence beginning with a specified time-delay with respect to the initial code phase of the reference state in state register 206. The time-delay may be provided by delaying the start of the FF PN generator 208 by either disabling the clock signal or by a separate EN signal. Consequently, this time-delay may not necessarily be aligned with either the clock of the reference PN generator, divided clock of the PN generator or the symbol clock. Each offset PN code sequence, or a portion thereof, may form a matched-filter PN vector.

In addition, the FF PN generator 208 may be clocked at a higher frequency than the clock of the local PN code sequence, which is of 1.2288 MHz for the exemplary IS-95 system. For example, the higher clock rate of 78.864 MHz may clock the offset PN code sequence at 78.864 Mcps. With this higher clock rate, up to 64 offset PN code sequences may be provided by the FF PN generator 208 during a period of the reference PN code sequence. The higher clock rate of the FF PN generator 208 combined with the ability to capture each reference state based on the symbol clock allows for generation of multiple offset PN code sequences, each having a different code-phase offset, in advance of the local PN sequence of reference PN generator 202.

The mask-offset circuit 212 combines particular mask values with the offset PN code sequences to provide matched-filter PN vectors that may be used to drive the matched-filter correlator 222. For example, to generate a vector for correlation with embedded sequence with code-phase offset $\Phi_{off1}$, the mask value to generate the sequence with code-phase offset ($\Phi_{off1}$-64) is combined with a given offset PN code sequence. The additional 64-chip offset may be added to account for vector generation time. If a second embedded sequence is present, to generate the sequence for correlation with offset $\lambda_{off2}$ the same reference state is used, but the mask ($\Phi_{off2}$-64) is applied. This example may correspond to a case where a receiver tracks two different pilot codes of two base stations in an IS-95 system. Each of the embedded sequences may have a known code-phase offset when compared to the first embedded sequence, so a single offset PN code sequence is generated, and each matched-filter PN vector for the two pilot code correlations is generated with respective mask values.

Figure 3:
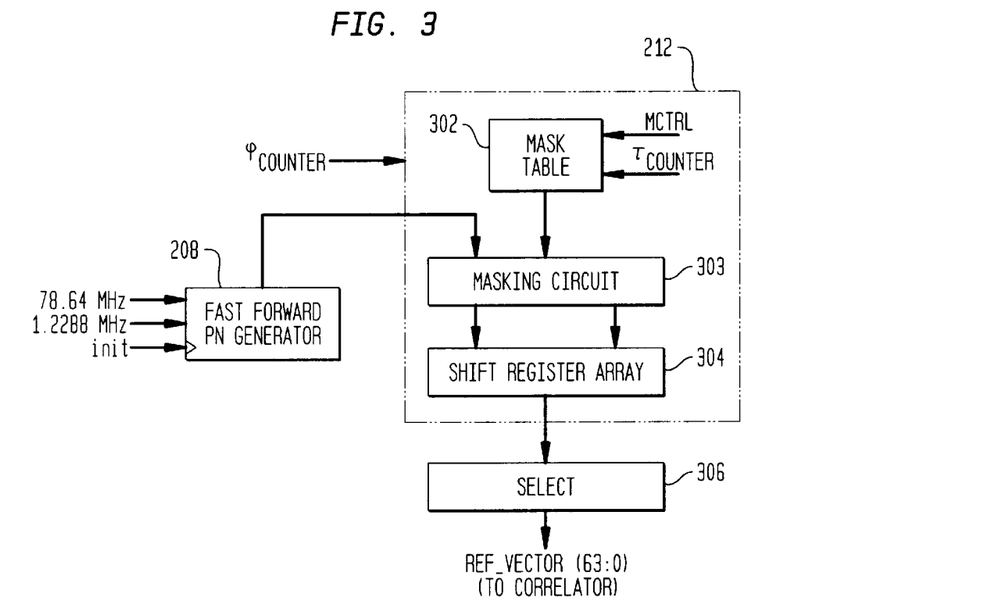
FIG. 3 shows a mask-offset circuit employed by the vector generator of FIG. 2.

FIG. 3 is a block diagram showing the mask-offset circuit 212 of vector generator 200 employed to drive the matched-filter correlator 222 of a CDMA demodulator. The fast forward PN generator 208 operates as described previously to provide multiple versions of the local PN code sequence to the mask circuit 212. The exemplary embodiment of the mask-offset circuit 212 includes mask table 302, masking circuit 303, and shift-register array 304. The system may also include a select circuit 306. Shift-register array 304 may be a double 64-bit-wide shift register, or an array of shift registers, and the select circuit 306 may be a MUX. In addition, an exclusive-or (XOR) operator may be included with the select circuit 306 if the matched filter PN vector is to be combined with another code vector such as an orthogonal Walsh code. For IS-95, for example, the matched-filter vector for data channels may be combined as a composite vector from both the Walsh code vector and the offset PN code sequence.

FF PN generator 208 may generate the offset PN code sequences as matched-filter PN vectors (I-seq and Q-seq) for correlation with both an in-phase and quadrature-phase channel (I/Q Rec) of an IS-95 system. As described previously, the counter 210 may also provide a counter value. The mask-offset circuit 212 includes the mask table 302 from which values of masks are selected based on at least one of i) a control signal MCTRL from vector generator control 220 (FIG. 2) and ii) the counter value $\phi$counter These mask values are then provided to the masking circuit 303, which combines these mask values with the offset PN code sequence to form matched-filter PN vectors. The masking circuit may either receive the entire offset PN code sequence or successive states of the FF PN generator 208. The matched-filter PN vectors of masking circuit 303 are provided to, and stored in, shift-register array 304.

As described previously, the offset PN code sequences or portions thereof may be the matched-filter PN vectors that are 64 chip long sequences. Since the values of the received signal in an I-channel and Q-channel are used (I/Q rec), the double, 64-bit-wide register may store both matched-filter PN vectors for the I-channel and Q-channel. The select circuit 306, in turn, selects the matched-filter PN vectors (I-seq and Q-seq) that are provided to the matched-filter correlator 222 (FIG. 2) of a CDMA receiver from the shift-register array 304. The shift-register array 304 may also be a large array of, for example, 64-bit wide registers storing many matched-filter PN vectors as entries generated from many different mask values. In this case, the select circuit 306 may require more complex address logic to select multiple shift-register array entries.

Figure 4:
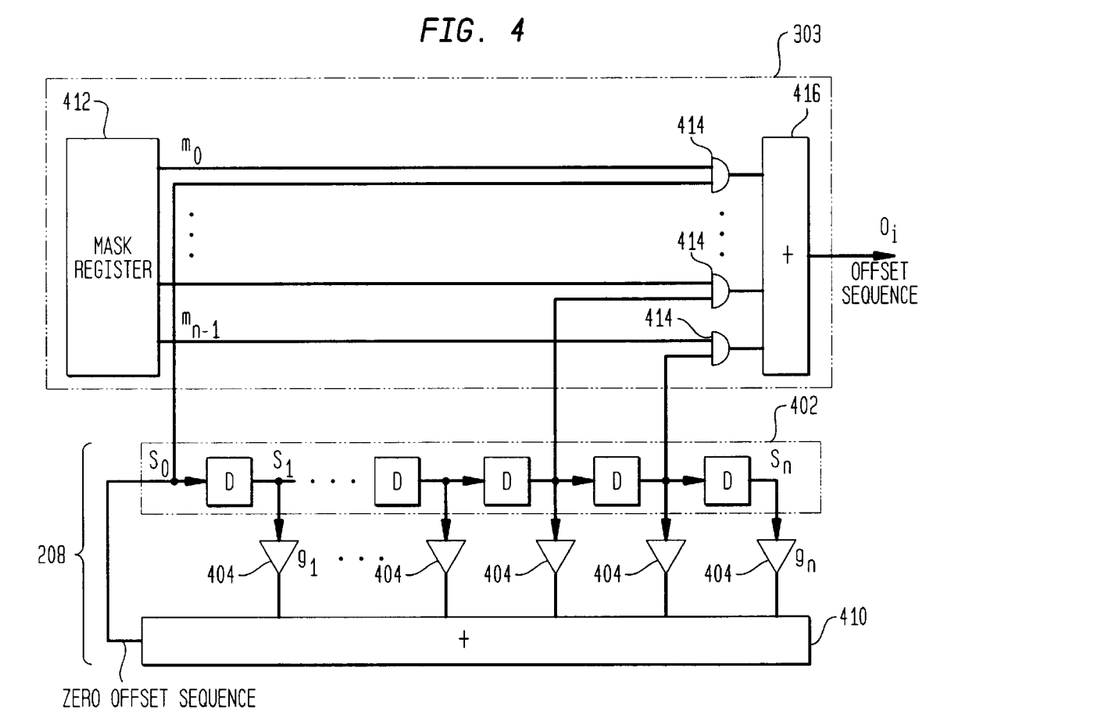
FIG. 4 shows a masking circuit employed by the mask-offset circuit of FIG. 3.

Referring to FIG. 4, there is shown a masking circuit 303 employed to generate matched-filter vectors from an offset PN code sequence provided from FF PN generator 208. As illustrated, the masking circuit 303 generates matched-filter vectors from successive states of the FF PN generator 208. Also, the FF PN generator 208 as shown in FIG. 4 may include shift register 402 having n stages, n an integer greater than 0, gain amplifiers 404, and modulo-2 adder 410. The masking circuit 303 includes a mask register 412, which receives mask values $M=m_{[n-1:0]}$ from the mask table 302 (FIG. 3), combiners 414 that may be AND gates, and modulo-2 adder 416. Gain amplifiers 404 have values $g_{[n:0]}$, which are polynomial coefficients of the PN generating polynomial G. Also, the values of the stages in shift register 402 is $S=s_{[n:1]}$, and the mask value in mask register 412 is $M=m_{[n-1:0]}$.

Shift register 402 is loaded with a reference state as described with respect to FIG. 2. Then, for each clock cycle, the values $S=S_{[n:1]}$ of the shift register stages are multiplied by polynomial coefficients $g_{[n:1]}$ via gain amplifiers 404 and combined in modulo-2 adder 410 to provide new value $s_0$. This is a cyclic process. The value $s_0$ in modulo-2 adder 410 is then applied to the first element of the shift register 402 and the last element $s_n$ is discarded. For each state of the shift register 402, a new state may be provided which corresponds to a value of the PN sequence shifted by an offset delay. Combining a state of shift register 102 with a corresponding mask value stored in mask register 412 generates this new state. The mask values $M=m_{[n-1:0]}$ are combined with the state of shift register 402 by combiners 414. The combined mask and register stage values are then modulo-2 added by adder 416 to provide the new state value $o_i$ of the offset sequence $O_{[n:1]}$.

Some systems, such as IS-95, may insert an extra value in the PN code sequence so that the PN code sequence is a multiple of 2. Additional logic may be required to insert the extra value into each sequence following 14 consecutive 1's or 0's. Additional logic for correcting the masked sequence may also be employed.

One alternative implementation of the mask-offset circuit 302 may include a sequence counter and a read-only memory (ROM). The ROM stores the PN sequence, and the sequence counter employs the mask value and the current counter value (φcounter to select the point in the stored sequence of the ROM to begin reading values. Another alternative implementation of the mask-offset circuit 302 of FIG. 3 may simply be as a large table of matched-filter vectors stored in, for example, ROM. A reference state of the reference PN generator, a mask value and/or a counter value may then be employed by a memory address processing module to select a desired matched-filter PN vector from memory. Efficient memory storage structures, such as a trie structure, may be employed to decrease search time of the table.

Consequently, a vector generator 200 in accordance with the present invention allows for generation of matched-filter PN vectors with multiple degrees of freedom. Each successive state of reference PN generator 202 is defined with state number $\lambda_L(t)$ having units as number of chips forward (or reverse) of an arbitrary zero code-phase state of the local PN code sequence (i.e., pilot code rollover, for IS-95). Each state of FF PN generator 208 is defined with state number $\lambda_F$ having units as number of chips forward (or reverse) of the captured reference state of the local PN code sequence (i.e., local state vector). Each state is defined at a period time, and may change with time in accordance with sequence generation since clock rates of the PN sequence generators may be different. For the mask offset circuit 212, the masked sequence code-phase offset of the mask value is defined as AM in number of chips. Offsets, which may be defined as the difference between states, are fixed values and may be less than a chip width. Mask offsets, however, are of an integer number of chips.

A new state $\lambda_N(t)$ at, for example, $t=t_1$ may be employed to generate a PN sequence as a matched-filter PN vector, and is defined as in equation (1):

$$\lambda_N(t_1)=\lambda_L(t_1)+\lambda_F(t_1)+\Delta_M \quad (1)$$

The matched-filter PN vector is a sequence that may be a portion of the sequence generated from this new state $\lambda_N(t)$, the portion being of length R chips (i.e., R an integer typically the length of a register). Further, a delay $\tau_{cr}$ may occur between the point in time ($t=t_1$) of generation of the matched-filter PN vector generated for a target state $\lambda_T(t)$ and the point in time $t=t_1+\tau_{cr}$ when the matched-filter PN vector is compared to the target vector. This time delay $\tau_{cr}$ requires an additional offset factor $\Phi_{\tau cr}$ (number of chips of the time delay between reference state capture and comparison time) to be considered. Therefore, the matched-filter vector has an offset $\Phi(t=t_1+\tau_{cr})$ as given in equation (2)

$$\Phi(t=t_1+\tau_{cr})=\lambda_T(t_1+\tau_{cr})-\lambda_N(t_1)-\Phi_{\tau cr} \quad (2)$$

Combining equation (1) and equation (2), the vector generator 200 provides the matched-filter PN vector from a new state with an offset $\Phi_{VEC}$ related to the target vector state $\lambda_T$ as given in equation (3):

$$\Phi_{VEC}=\lambda_T(t_1+\tau_{cr})-\lambda_L(t_1)-\lambda_F(t_1)-\Delta_M-\Phi_{\tau cr} \quad (3)$$

Thus, vector generator 200 in accordance with the present invention allows for four degrees of freedom to provide the matched-filter PN vector, or offset reference sequence fragment, for comparison with the target vector.

In one exemplary embodiment, the state register 206 captures successive reference states of the local PN code sequence every data symbol period (i.e., a 64-chip period). The clock rate of the FF PN generator 208 is 64 times higher than the clock rate of the reference PN generator 202. The FF PN generator 208 then advances 64 clock periods for each clock cycle of the local PN code sequence of the reference PN generator 202 to generate an offset PN code sequence of, for example, 64 chips, for each reference state. Then, the divided clock rate of the reference PN generator 202 allows the vector generator 200 to cycle through each of the possible reference state numbers. The vector generator 200 captures in state register 206, and loads into the FF PN generator 208, each successive reference state of the shift register of reference PN generator 202 in response to the INIT and EN signals.

For the exemplary embodiment, within the period of the local PN code sequence at 1.2288 MHz up to 64 different offset PN code sequences are generated, each with a corresponding code-phase offset from the initial state of the reference local PN code sequence. Each code-phase offset may be equivalent to a single chip, multiple chips based on the delay enabling the clock of FF generator 208, or an integer multiple of 64-chips based on capture of successive states. Each offset PN code sequence, or a portion thereof, either forms a matched-filter PN vector, or is used in combination with a mask value to form a matched-filter PN vector. Counter 210 clocked with the 78.864 MHz clock may be employed to give a counter offset value φcounter corresponding to the code-phase offset of each offset PN code sequence defined as a matched-filter PN vector. The counter offset value may also be used by vector generator control 220 to select particular mask values for offset sequences of the PN code sequence.

The counter value may be offset by a predetermined number if, for example, multiple pilot codes are tracked. Since the code-phase offsets between base stations may be known, such as the case with IS-95, the counter may be used as a reference for the currently tracked pilot code and pilot codes of surrounding base stations.

Figure 5:
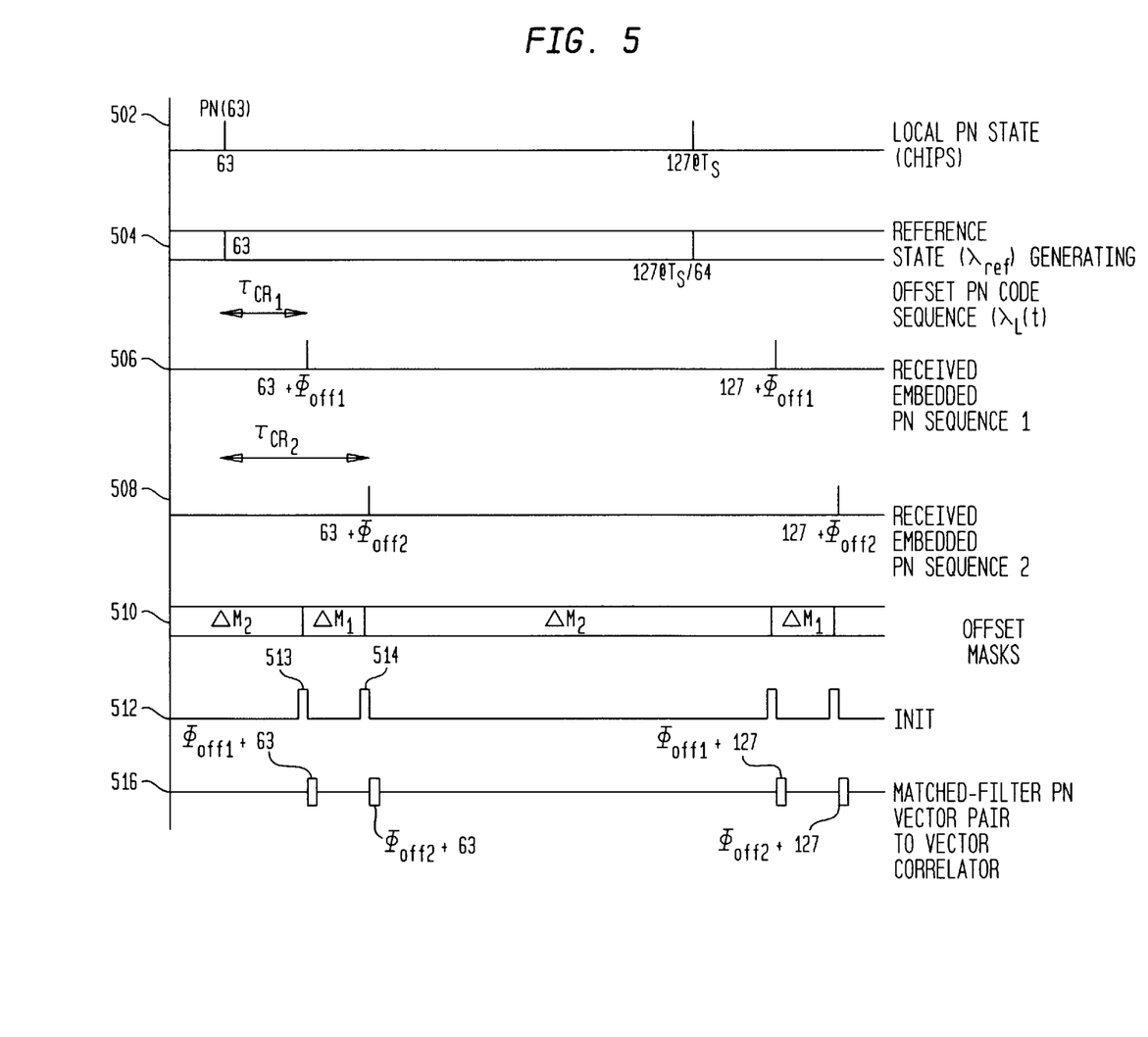
FIG. 5 illustrates an exemplary timing diagram of the vector generator in accordance with an embodiment of the present invention.

FIG. 5 illustrates a timing diagram of the vector generator 200 in accordance with the present invention. As described for the previous exemplary embodiment, during every symbol period the state register 206 may capture a reference state λREF of the reference PN generator providing the local PN sequence with successive states $\lambda_L(t)$. The FF PN generator 208 advances 64 clock periods in a symbol period and cycles through 64 states, generating multiple offset PN code sequences having state $\lambda_F(t)$. The offset $\Phi_N$-64 may be employed to generate the matched-filter PN vector corresponding to a desired offset $\Phi_N$ from the local PN code phase $\lambda_L(t)$, because the reference state is 64 bits ahead of the correlation point. Each of n matched-filter PN vectors is symbol-aligned (a multiple of 64 bits from the local zero pilot rollover), but is launched with a time delay $\tau_{crn}$ with respect to the symbol boundary. Here the delay launching at time $\tau_{crn}$ is inserted by the vector correlator using the vector generator 200.

To generate a matched-filter PN vector for correlation with embedded sequence having offset $\Phi_{off1}$ corresponding to time-delay $\tau_{off1}$, a mask value for offset $\Delta_{M1}$ to generate the offset PN code sequence with offset $\Phi_{off1}$ is used. The masked sequence generates a vector aligned with the arriving 64 bits of the embedded sequence, and is applied with time delay $\tau_{cr1}$. To generate the sequence for correlation with offset $\Phi_{off2}$ corresponding to time-delay $\tau_{off2}$, the same reference state $\lambda_L(t)$ is used, but the mask value for offset $\Delta_{M2}$ is applied. The shift register contents are overwritten with the new matched-filter PN vector, which is applied with time delay $\tau_{cr2}$.

As shown on 502 in FIG. 5, during a symbol period $T_S$ the reference PN generator 202 provides chip values corresponding to the local PN code sequence values 63 through value 127. Consequently, 504 shows the first 15 values (63 through 77) of the local PN code sequence are stored as the reference state in the state register 206 (assuming a 15-stage, linear-feedback shift register is employed by the reference and FF PN generators 202 and 208, respectively). In addition, the chip values corresponding to the local PN code sequence values 63 through value 127 form the offset PN code sequence, but with period ($T_S/64$). First and second embedded PN sequences are received and are shown on 506 and 508, respectively. As shown the first PN sequence has an offset of $\Phi_{off1}$ and the second embedded PN sequence has a offset of $\Phi_{off2}$ from the chip value 63. Each offset $\Phi_{off1}$ and $\Phi_{off2}$ may correspond to a PN sequence of a different base station.

First and second mask values $\Delta_{M1}$ and $\Delta_{M2}$ are retrieved as shown on 510. The timing for the INIT signal provided to the FF PN generator is shown on 512. Successive transitions of INIT at 513 and 514, respectively, generate two, 64-bit offset sequences equivalent to the offset PN code sequence of 504. As shown in FIG. 5, the retrieval of the first and second mask values $\Delta_{M1}$ and $\Delta_{M2}$ may occur concurrently with generation of the two, 64-bit PN code sequences from state $\lambda_L(t)$, but such timing may not be necessary. Finally, mask-offset circuit 212 combines the mask values and offset PN code sequences as shown on 516 to form the matched-filter PN vector pair.

FIG. 5 shows the matched-filter vector pair generated nearly synchronized with the embedded PN sequences of 506 and 508 (i.e, launched at time delay $\tau_{cr1}$ and $\tau_{cr2}$), but this may not necessarily occur. However, the vector generator may generate several matched-filter vector pairs as shown in FIG. 5, with each pair launched at a different time delay $\tau_{crn}$. Each time delay $\tau_{crn}$ may result in each pair being separated in code phase by either a chip-width or a fraction of a chip-width. Consequently the FF PN generator 208 cycles through all of the possible values of the PN sequence given the known offsets and various time-delays.

A vector correlator employing the vector generator in accordance with the present invention may accumulate multiple-chip reference and data vectors, and begin cross-correlation calculations in parallel. Using pipelining or multiplexed serial correlation operations, the vector correlator may employ a single correlator circuit to accommodate a large number of correlation operations in parallel. The vector generator of the present invention generates the corresponding large number of matched-filter PN vectors with code phase offsets specified by such a vector correlator. The vector generator of the present invention may allow a design trade-off opportunity to reduce the number of matched-filter PN vector storage registers required by the vector correlator with increased vector generator control complexity. In addition, the vector generator allows greater flexibility to generate non-symbol aligned matched-filter PN vectors to exploit correlator capacity in high-speed data and/or handoff situations.

While the exemplary embodiments of the present invention have been described with respect to processes of circuits, the present invention is not so limited. As would be apparent to one skilled in the art, various functions of circuit elements may also be implemented in the digital domain as processing steps in a software program. Such software may be employed in, for example, a digital signal processor, micro-controller or general purpose computer.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method of generating at least one matched-filter vector from a reference PN sequence, the reference PN sequence having an initial state and a first clock rate, comprising the steps of:

a) capturing an initial state of the reference PN sequence; and b) generating at least one fast-forward PN sequence from the captured initial state, the fast-forward PN sequence having chip values equivalent to chip values of the reference PN sequence and having a second clock rate greater than the first clock rate, wherein each matched-filter vector corresponds to one fast-forward PN sequence having a corresponding code-phase offset when compared to the code phase of the reference PN sequence.

2. The method as recited in claim 1, further comprising the step of capturing one or more successive states of the reference PN sequence; and step b) further includes the step b1) of generating at least one fast-forward PN sequence from each successive state.

3. The method as recited in claim 2, further comprising the step counting based on the initial state and the second clock rate of the fast-forward PN sequence to provide a counter value corresponding to each code-phase.

4. The method as recited in claim 1, further comprising the step of c) applying at least one mask vector to the fast-forward PN sequence to form the matched-filter vector, the corresponding code-phase offset of the matched-filter vector determined by the mask vector.

5. The method as recited in claim 4, further comprising the step of:

d) counting based on the initial state and the second clock rate of the fast-forward PN sequence to provide a counter value corresponding to each code-phase offset, and wherein step c) further includes the step of c1) selecting each mask vector based on the counter value.

6. The method as recited in claim 5, further comprising the steps of e) computing a base station code-phase offset of a pilot signal of the base station, and f) adjusting the counter value of step e) based on the base station code-phase offset.

7. The method as recited in claim 4, further comprising the step repeating steps a), b) and c) to provide an In-phase matched-filter vector of an In-phase channel and a Quadrature-phase matched-filter vector of a Quadrature-phase channel.

8. The method as recited in claim 7, further comprising the steps of:

e) storing each In-phase matched-filter vector and Quadrature-phase matched-filter vector;

f) alternatively providing the stored In-phase matched-filter vector and the stored Quadrature-phase matched-filter vector.

9. The method as recited in claim 1, further including the step of repeating of steps a) and b) to provide a plurality of matched-filter vectors, each having a different code-phase offset, for correlation with a received spread spectrum signal having a plurality of multipath components of a transmitted spread-spectrum channel signal.

10. The method as recited in claim 1, further including the step of repeating of steps a) and b) to provide a plurality of matched-filter vectors as at least two groups, each matched-filter vector of each group having the different code-phase offset related to a code-phase offset of a pilot signal of a base-station.

11. The method as recited in claim 1, wherein step b) provides the second clock rate as the first clock rate multiplied by a number of chips of the reference PN sequence in a data symbol period.

12. The method as recited in claim 1, wherein the generating step b) generates a fast-forward PN sequence for each transition of a data symbol clock, the first clock rate being less than the clock rate of the data symbol clock.

13. The method as recited in claim 1, further comprising the step of retrieving, based on the fast-forward PN sequence, at least one matched-filter vector from a sequence table, each matched-filter vector stored in the table having a different code-phase offset of the reference PN sequence.

14. A vector generator for generating at least one matched-filter vector from a reference PN sequence, the reference PN sequence having an initial state and a first clock rate, comprising:

a register adapted to capture an initial state of the reference PN sequence; and a fast-forward PN generator adapted to generate at least one fast-forward PN sequence from the captured initial state, the fast-forward PN sequence having chip values equivalent to chip values of the reference PN sequence and the fast-forward PN generator providing the fast-forward PN sequence having a second clock rate greater than the first clock rate, wherein each matched-filter vector corresponds to one fast-forward PN sequence having a corresponding code-phase offset when compared to the code phase of the reference PN sequence.

15. The invention as recited in claim 14, wherein the register captures one or more successive states of the reference PN sequence; and the fast-forward PN generator generates at least one fast-forward PN sequence from each successive state.

16. The invention as recited in claim 15, further comprising a counter adapted to forming a counter value corresponding to each code-phase based on the initial state and the second clock rate of the fast-forward PN sequence.

17. The invention as recited in claim 14, further comprising a mask-offset circuit, the mask offset circuit adapted to apply at least one mask vector to the fast-forward PN sequence to form the matched-filter vector, the corresponding code-phase offset of the matched-filter vector determined by the mask vector.

18. The invention as recited in claim 17, further comprising:

a counter adapted to form a counter value corresponding to each code-phase offset based on the initial state and the second clock rate of the fast-forward PN sequence; and a memory having a mask table, wherein the mask-offset circuit is further adapted to select the mask vector from the mask table based on the counter value.

19. The invention as recited in claim 18, wherein the mask-offset circuit selects at least one other mask vector to form a matched-filter vector having a code-phase offset corresponding to a pilot signal code-phase offset of a base station.

20. The invention as recited in claim 17, wherein the fast-forward generator generates a matched-filter vector for an in-phase channel and a matched-filter vector for a quadrature-phase channel.

21. The method as recited in claim 20, further comprising a shift register adapted to store each matched-filter vector of the in-phase and quadrature-phase channel;

a select circuit adapted to alternatively providing each stored matched-filter.

22. The invention as recited in claim 14, wherein the fast-forward PN generator provides a plurality of matched-filter vectors, each having a different code-phase offset, for correlation with a received spread spectrum signals having a plurality of multipath components of a transmitted spread-spectrum channel signal.

23. The invention as recited in claim 14, wherein the fast-forward PN generator provides the plurality of matched-filter PN sequence vectors as at least two groups, each matched-filter vector of each group having the different code-phase offset related to a code-phase offset of a pilot signal of a base-station.

24. The invention as recited in claim 14, wherein the second clock rate is the first clock rate multiplied by a number of chips of the reference PN sequence in a data symbol period.

25. The invention as recited in claim 14, wherein the fast-forward PN generator generates a fast-forward PN sequence for each transition of a data symbol clock, the first clock rate being less than the clock rate of the data symbol clock.

26. The invention as recited in claim 14, further comprising a memory having a sequence table the sequence table storing a plurality of matched-filter vectors each having a different code-phase offset of the reference PN sequence.

27. An integrated circuit having a vector generator for generating at least one matched-filter vector from a reference PN sequence, the reference PN sequence having an initial state and a first clock rate, comprising:

a register adapted to capture an initial state of the reference PN sequence; and a fast-forward PN generator adapted to generate at least one fast-forward PN sequence from the captured initial state, the fast-forward PN sequence having chip values equivalent to chip values of the reference PN sequence and the fast-forward PN generator providing the fast-forward PN sequence having a second clock rate greater than the first clock rate, wherein each matched-filter vector corresponds to one fast-forward PN sequence having a corresponding code-phase offset when compared to the code phase of the reference PN sequence.

28. The invention as recited in claim 27, further comprising a mask-offset circuit, the mask offset circuit adapted to apply at least one mask vector to the fast-forward PN sequence to form the matched-filter vector, the corresponding code-phase offset of the matched-filter vector determined by the mask vector.

* * * * *